US011521596B2

(12) United States Patent
Krishnamoorthy et al.

(10) Patent No.: US 11,521,596 B2
(45) Date of Patent: Dec. 6, 2022

(54) MACHINE LEARNING FRAMEWORK FOR TUNING INTERACTIVE VOICE RESPONSE SYSTEMS

(71) Applicant: Bank of America Corporation, Charlotte, NC (US)

(72) Inventors: Bharathiraja Krishnamoorthy, Plano, TX (US); Emad Noorizadeh, Plano, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 328 days.

(21) Appl. No.: 16/993,478

(22) Filed: Aug. 14, 2020

(65) Prior Publication Data

US 2022/0051658 A1 Feb. 17, 2022

(51) Int. Cl.
*G10L 15/06* (2013.01)
*G06N 20/20* (2019.01)
*G06K 9/62* (2022.01)
*G06F 16/9032* (2019.01)

(52) U.S. Cl.
CPC ...... *G10L 15/063* (2013.01); *G06F 16/90332* (2019.01); *G06K 9/6262* (2013.01); *G06N 20/20* (2019.01); *G10L 2015/0635* (2013.01)

(58) Field of Classification Search
CPC .......... G10L 15/063; G10L 2015/0635; G10L 15/01; G10L 15/1822; G10L 25/48; G06F 16/90332; G06F 40/30; G06K 9/6262; G06K 9/6288; G06N 20/20; H04M 3/28; H04M 3/4936
See application file for complete search history.

(56) References Cited

U.S. PATENT DOCUMENTS

2021/0117977 A1* 4/2021 Kim .................. G06F 17/15
2022/0036163 A1* 2/2022 Kuo .................. G06N 3/084

OTHER PUBLICATIONS

Salma Ghoneim, "Accuracy, Recall, Precision, F-Score & Specificity, Which to Optimize On?" https://towardsdatascience.com/accuracy-recall-precision-f-score-specificity-which-to-optimize-on-867d3f11124, Towards Data Science, Apr. 2, 2019.
"F-Score: What is the F-Score?" DeepAI, Retrieved on Jul. 24, 2020.
"Harmonic Mean: What is Harmonic Mean?" https://deepai.org/machine-learning-glossary-and-terms/harmonic-mean#:~:text=What%20is%20Harmonic%20Mean%3F.the%20reciprocals%20of%20the%20data., DeepAI, Retrieved on Jul. 24, 2020.
(Continued)

*Primary Examiner* — Bhavesh M Mehta
*Assistant Examiner* — Darioush Agahi
(74) *Attorney, Agent, or Firm* — Weiss & Arons LLP (57) ABSTRACT

An artificial intelligence ("AI") system for tuning a machine learning interactive voice response system is provided. The AI system may perform analysis of outputs generated by the machine learning models. The AI system may determine an expected model output for a given test input. The AI system may determine accuracy, precision and recall scores for an actual output garneted in response to the test input. The system may determine performance metrics for interim outputs generated by individual machine learning models within the interactive voice response system. The AI system may replace malfunctioning models with replacement models.

20 Claims, 7 Drawing Sheets

(56) References Cited

OTHER PUBLICATIONS

"Machine Learning: What is Machine Learning?" https://deepai.org/machine-learning-glossary-and-terms/machine-learning#:~:text=Machine%20learning%20is%20a%20field.to%20%22learn%22%20through%20experience. DeepAI, Retrieved on Jul. 24, 2020.
"F1 Score," https://en.wikipedia.org/wiki/F-score, Wikimedia Foundation, Inc., Jul. 8, 2020.

\* cited by examiner

MACHINE LEARNING FRAMEWORK FOR TUNING INTERACTIVE VOICE RESPONSE SYSTEMS

FIELD OF TECHNOLOGY

Aspects of the disclosure relate to technology for improving computer-human interactions.

BACKGROUND

Interactive voice response ("IVR") systems provide automated tools for interacting with human callers. A caller may initiate contact with an IVR system and provide inputs to the IVR system. The caller inputs may include voice data, text data and selection of options displayed to the caller. These caller inputs typically correspond to a caller attempting to express a purpose for contacting the IVR system. The IVR system may use a variety of techniques to discern a meaning of caller inputs and efficiently satisfy the caller's purpose.

An IVR system may not be able to discern the purpose or goal of a caller. In such instances, the IVR system may link the caller to a human agent. An IVR system may also "think" that it does understand the purpose or goal of the caller. However, the IVR system may in fact have misinterpreted the caller inputs. In some scenarios, the IVR system may seem to correctly interpret individual caller inputs. However, the IVR system may not able to understand a context of the caller input within a larger conversation.

It is technically challenging to test the performance of IVR systems. IVR systems may include multiple and interconnected machine learning models. It is technically challenging to track and trace inputs and outputs of each model. Furthermore, it is technically challenging to identify how to cure defects identified in a machine learning system and whether curing the defects will cause a misinterpretation of caller inputs in other scenarios.

As described herein, a MACHINE LEARNING FRAMEWORK FOR TUNING INTERACTIVE VOICE RESPONSE SYSTEMS provides technical solutions for testing and remediating misinterpretations of caller inputs detected in complex machine learning systems.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Machine learning methods for improving operation of an interactive voice response ("IVR") system are provided. Methods may include submitting a test input to the IVR system. The test input may include a voice input. The voice input may include human speech. The test input may include a set of voice inputs that form a conversation. The voice input may include prosody information. Prosody information may include non-semantic aspects of speech. For example, prosody information may include changes in pitch, loudness, timbre, speech rate, and pauses.

A test input may include semantic information. Semantic information may include logical aspects of meaning, such as sense, reference, implication, veracity, and logical form of speech. Sematic information may include word meanings and relationships between words.

The IVR system may include a plurality of machine learning models. Each of the machine learning models may receive an input and generate an output. A generated output of a first model may form the input of a second model. The plurality of machine learning models may attempt to collectively understand what has been said in the voice input and how to respond to a voice input. Each of the machine learning models may be daisy-chained or grouped in other configurations. Each machine learning model may attempt to process an incremental understanding of a voice input.

Typically, a group of machine learning models is only testable as a collective group. A test input is submitted to the group of the models and a single, responsive output is generated. However, such testing does not provide insight into performance of individual machine learning models in the group of models. Such group testing also increases resource waste. Because granular testing of individual machine learning is not available, if the group of machine learning model generates an erroneous output, the entire group of models may be discarded. However, in fact, if individual models were tested, such tests may show that only one or more two of the models in the group are malfunctioning.

The present disclosure provides artificial intelligence and machine learning tools for testing individual or interim models within a larger grouping of machine learning models. An "interim" model may refer to a machine learning model that processes an output of another model. An interim model may refer to a model generates an output that is passed as an input to another model.

The group of models may collectively process a voice input. An output of the collective processing may be an understanding of a service a human user has requested from the IVR system. Such an understanding may be the product of multiple, incremental processing steps by a plurality or grouping of machine learning models.

Each model in the plurality may extract and process different information from a voice input. For example, a first model may translate the received voice inputs into commands or text. A second model may translate the commands or text generated by the first model into service requests or problem sets. A third model may attempt to understand prosody information included in the voice input. For example, the third model may detect a pitch of sounds (e.g., measured in hertz), duration of sounds (in milliseconds), intensity or loudness (e.g., measured in decibels) and timbre (e.g., measured by energy distribution within a frequency range).

A fourth model may attempt to understand semantic information included in the voice input. A fifth model may attempt to understand a context of the voice input based on the prosody, sematic and text processed by the second, third and fourth models.

A sixth model may analyze a transaction history of a caller that submitted the voice input. The transaction history may provide background information regarding the caller. Transaction history may provide insights into a purpose or goal of the caller for contacting the IVR system. The transaction history may provide context for a current voice input submitted to the IVR system. For example, a transaction history may show that a prior issue raised by the caller has not yet been successfully resolved.

A seventh model may attempt to understand the voice input within the context of a plurality of voice inputs that form a conversation. A seventh model may also attempt to formulate available services that may address a caller's concern.

Each of the interim models may receive an interim input. The interim input may be an output generated by a different model. Methods may include, for each of a plurality of interim models, tracking an interim input submitted to each of the plurality of interim models. Methods may include tracking an interim output generated by each of the plurality of interim models in response to the interim input.

To obtain interim inputs and outputs, methods may include adding programming to machine learning models. The programming may allow a function call to be submitted to a model. In response to the received function call, the model may provide, to a requesting program, the input it received and the output it generated in response to the input.

Methods may include applying a first machine learning testing technique. The first machine learning testing technique may stitch together each of the interim inputs and outputs generated by a plurality of models in response to a test input. The stitching may generate an actual final output produced by the plurality of machine learning models in response to a test input. In some embodiments, a machine learning model may perform the stitching. In some embodiments, one of the plurality of models may perform the stitching.

Applying the first machine learning testing technique may assess an impact of each interim output on an actual final output generated by the plurality of models. The first machine learning testing technique may identify a target model generating that is misinterpreting an interim input and therefore distorting its interim output and distorting the actual final output. The assessment may include comparing the actual final output to an expected final output associated with a test input. The first machine learning testing technique may detect one or more interim models that generate an actual interim output that is misinterpreted, relative to the test input, by a subsequent interim model. The misinterpretation of any input may distort the resulting output.

Methods may include applying a second machine learning testing technique. The second machine learning testing technique may determine a replacement interim model for the malfunctioning model. The second machine learning testing technique may exchange an interim model that generates a distorted actual interim output with the replacement interim model. The second machine learning testing technique may replace the interim model with a replacement model that is expected or known to reduce interim input misinterpretation and interim output distortion.

A machine learning model testing technique may detect misinterpretation in an interim output by comparing the interim output to a known output expected from a model or a desired output expected from a model in response to a test input. In some embodiments, each model may be programmed to include a test input and/or an expected output. The test input and expected output included with the model may be provided in response to a function call from a testing machine learning model or other program for testing a machine leaning model.

Each time the second machine learning testing technique is applied to a single model or a plurality of models, the second machine learning testing technique may reduce distortion of a final output generated by the plurality of interim models. Exemplary distortion may include deviation of a final output actually generated by the plurality of interim models in response to a test input from an expected output associated with the test input.

The second machine learning testing technique, in response to detecting a distorted actual interim output, may generate a new sequential order of how the plurality of interim models process inputs within the IVR system. Reordering individual models included in the plurality of models may cause different models to process interim inputs at different stages compared to the original order. Reordering the models may reduce a deviation of an interim output from an expected output of a model.

For example, by reordering the models, a target model may only process information that has already been processed by other models. The target model may provide more accurate or precise output when the interim input provided to the target model has already been processed by the other models. The other models may add information to the originally received test input. Such additional information may include analysis of prosody, sematic and contextual properties extracted from the test input.

Methods may include detecting one or more of the plurality of interim models that generate a distorted target interim output. A distorted actual interim output may be an output that deviates from an expected output of the target model. A distorted actual interim output may result from a misinterpretation of an input. An expected output of the target model may be determined by a creator of the target model. The expected output of the target model may be determined by a creator of the model.

The creator of the model may also formulate one or more test inputs that may be submitted to the target model and trigger generation of the expected output. A model may be tested after shifting a position of the model with respect to other models included in an IVR system. The testing may determine whether after the shifting the target model generates the expected output in response to the test input.

Accuracy, precision, recall, sensitivity or any other metric associated with a machine learning model may be measured in relative terms. Machine learning models may generate range of outputs and rank those outputs. A misinterpreted input or distorted output may be detected when the actual generated output is outside the bounds or range of outputs typically generated by the model. An appropriate bound or range of outputs may be measured based on accuracy, precision, F-score or other testing technique for assessing output generated by a machine learning model.

Methods may include submitting a test input to a first subset of interim models. The test input may be an interim input. The test input may be submitted to the first subset of models in parallel with submitting the same interim input to a second subset of interim models. The first subset may include different models than the second subset. The first subset may include a different order of models than the second subset. Each subset of models may perform different functions within an IVR system. Each subset of models may utilize different combinations of models to arrive at a desired or expected output in response to the same test input.

For the first subset of interim models, methods may include applying the first machine learning testing technique. The first machine learning testing technique may to stitch together each of the interim inputs and outputs generated by models in the first subset and generate a first final output. For the second subset of interim models, methods may also include applying the first machine learning testing technique. The first machine learning testing technique may stitch together each of the interim inputs and outputs generated by models in the second subset and generate a second final output.

Methods may include applying the second machine learning testing technique to detect at least one model in the first subset or at least one model in the second subset that generates an actual interim output that is distorted. A distorted interim output may be detected based on comparing an actual output generated by one or more models to an expected output associated with a test input.

Methods may include removing, from the IVR system, a subset of interim models that generate a distorted target interim output. Methods may include replacing the removed subset with a reordered subset of the same models. Methods may include replacing the removed subset with a subset of different models than the models in the first subset.

Illustrative interim models may include a first model for converting speech to digital text. Interim models may include a second model for determining one or more prosody attributes of the digital text. Interim models may include a third model for determining a sentiment associated with the prosody attributes. Interim models may include a fourth model for assigning a label to the interim output of the first, second and third models.

Methods may include, determining for an actual interim output, accuracy of the interim output relative to an expected interim output. Accuracy may generally refer to deviation of a measurement from a reference value. Methods may include determining precision of the actual interim output. Precision may refer to deviation of multiple actual outputs generated by a model from each other. Each actual output may be generated in response to different test inputs. Precision may be measured independently of accuracy or a deviation of actual outputs from a refence value.

Methods may include determining, for an actual output, recall of the actual output. Recall may refer to a ratio of a total number of actual outputs generated by a model that are within a predefined range of an expected output, to all inputs processed by the model. Methods may include determining an F-score for a target model. F-score refers to a harmonic mean of a model's precision and recall metrics. An exemplary F-score may be defined as:

$$F-\text{score} = \frac{2}{\text{recall}^{-1} + \text{precision}^{-1}}$$

Methods may include determining whether an actual interim output has been distorted based on the accuracy, precision and F-score metrics of the actual interim output. Metrics for the actual interim output may be determined based on an expected interim output. The expected interim output may be an output that is expected to be generated by a model in response to a known or test input. The expected interim output may be determined by a creator of the model.

Methods may include detecting whether a plurality of interim models collectively generate a distorted actual final output. The actual final output may be a response provided by the IVR system to a caller. For example, the actual final response may present information the IVR system has determined (using the plurality of models) the customer is seeking. Methods may include determining whether the actual final output provided by the IVR system has been distorted.

A distortion may be detected based on accuracy, precision and F-score of interim outputs generated by each interim model. For example, methods may include determining when metrics associated with an actual interim output deviates by more than a threshold value from the expected interim output associated with a model. When a threshold number of actual interim outputs are distorted, the actual final output may be registered as also being distorted.

An actual final output may not deviate from an expected final output for a given test input. However, machine learning models are not configured to provide binary right or wrong answers. Rather, machine learning algorithms are configured to provide relevant responses to a threshold number of inputs. An actual final output that is distorted may indicate that the plurality of machine learning models, as a group, are associated with a threshold probability of generating irrelevant responses to caller inputs. "Relevant" and "irrelevant" responses may be determined based on whether the responses generated by the models address a known caller issue raised in a test input.

Methods may include determining accuracy of an actual final output generated by a model relative to an expected final output associated with a test input that has been submitted to the model. Methods may include determining precision of the actual final output relative to an expected output associated with the test input. Methods may include determining an F-score of the actual final output relative to an expected output associated with the test input. Methods may include determining whether to suspend operation of the plurality of interim models within the IVR system based on the accuracy, precision and F-score of the actual final output generated by the plurality of models.

A test input may include a plurality of human voice utterances that comprise a test conversation. The test conversation may include an initial request submitted by a caller to the IVR system. The initial request may include a question or concern of caller. The IVR system, using the plurality of models, may analyze the test input, attempt to decipher the test input and respond to the caller's question or concern. The IVR system may provide responses to the caller and the caller may provide additional requests to the IVR system. Each request may be a voice utterance.

A set of caller requests or inputs may form a conversation between the caller and the IVR system. Machine learning models may be configured to successfully address the caller's question or concern after receiving additional information from the caller. Machine learning models may be configured to attempt to understand an initial request received from a caller. The machine learning models may be configured to process an entire conversation before providing the caller a relevant response.

To provide relevant responses to a caller, outputs generated by machine learning models should progressively converge on a relevant actual final output. The machine learning models are less likely to provide a relevant actual final output if actual interim model outputs are diverging from an expected output associated with an utterance or an entire conversation.

Methods may include submitting a set of test utterances that form a test conversation to a plurality of models. Methods may include detecting whether each utterance in the set is misinterpreted by the one or more models. Methods may detect how each of caller utterance included in a conversation is processed by interim models included in an IVR system. Methods may include detecting distorted outputs generated by each model in response to each caller utterance. A distorted utterance may indicate that a model or plurality of models are less likely to provide relevant actual final outputs to caller inputs.

When one or more distorted outputs are detected, methods may include tuning the IVR system to reduce the likelihood of input misinterpretation and output distortion. Tuning the IVR system may include reordering one or more models included in the IVR system. Tuning the IVR system may include replacing one or more models included in the IVR system. Tuning the IVR system may include retraining one or more models included in the IVR system using updated training data.

An artificial intelligence ("AI") system for tuning operation of an interactive voice response ("IVR") system is provided. The system may include a plurality of machine learning models. The plurality of machine learning models may be configured to interpret a set of caller utterances. The set of utterances may include one or more voice inputs of a human caller. The set of utterances may collectively form a conversation.

The system may include a tuning software module. The tuning module may be configured to test each member of the set of utterances by registering an interim input received by a target model. The target model is one of the plurality of models. The tuning module may register an interim actual output generated by the target model in response to the interim input. The tuning module may register deviation of the actual interim output from an expected interim output. The expected interim output may be a desired, relevant output expected to be generated by the target model in response to the interim input.

The system may include an AI engine. The AI engine may detect distortion when an actual interim output generated by a model deviates from expected interim output associated with a voice input. The AI engine may detect a deviation that corresponds to an actual final output generated by the IVR system that does not correspond to an expected final output generated by the IVR system in response to a test input. When the AI engine detects distorted output, the AI engine may identify a replacement model that decreases deviation between the interim output and the expected interim output. The AI engine may exchange a target model with the replacement model within the IVR system. Replacing the target model with the replacement model may reduce deviation of an actual final output from an expected final output.

When an actual final output deviates from the expected final output by a threshold value, the AI engine may exchange each of the plurality of models for a set of replacement models. For example, the deviation of the actual final output from the expected final output may be so great and indicate that the plurality of models, collectively, are unlikely to provide relevant results to caller inputs. The AI engine may therefore replace all of the models in a group with models known to provide relevant responses.

The set of utterances may include sequentially issued voice commands of a caller. The tuning module may be configured to test each member of the set of utterances in parallel. Testing in parallel may independently determine whether each individual utterance has been misinterpreted by the models. Testing in parallel may determine whether the plurality of machine learning models, collectively, provide relevant response to the set of utterances. The AI engine may determine how each interim response may be interpreted by a human caller. The AI engine may determine whether each model generated output to each utterance converges on, or diverging from, an expected final output associated with specific utterance or an entire conversation.

The set of utterances may include sequentially issued voice commands. The tuning module may be configured to test a first subset of utterances in parallel. The tuning model may be configured to test a second subset of utterances sequentially.

Deviation of an actual output (final or interim) from an expected output (final or interim) may be defined by one more performance metrics associated with the actual final output. An illustrative performance metric may include accuracy. Accuracy of an actual interim output may be determined relative to a value of an expected interim output. An illustrative performance metric may include precision. Precision of an actual interim output may be determined relative to a value of an expected interim output. An illustrative performance metric may include an F-score. An F-score of an actual interim output relative may be determined relative to a value of an expected interim output.

A threshold deviation of a performance metric may correspond to distortion of an output generated by a model. In response to detecting distortion, the AI engine may be configured to iteratively exchange one or more of the plurality of models with one or more replacement models. The AI engine may iteratively exchange one or more of the plurality of models until an actual final output corresponds to an expected final output. The AI engine may iteratively exchange one or more of the plurality of models until an actual final output is within a threshold value of an expected final output.

The IVR system may include multiple layers of models that process voice utterances. The AI engine may be configured to isolate a subset of models within the IVR system. The AI engine may be configured to test the subset of the models. The AI engine may test the subset using a test input that is submitted to the subset of models. The AI engine may formulate the test input by applying illustrative processing that may be applied to a voice utterance by other models in other layers of the IVR system. After the AI engine formulates the test input, the test input may be submitted to the subset of models for testing.

An artificial intelligence ("AI") method for tuning operation of an interactive voice response ("IVR") system is provided. Tuning operation of an IVR system may include improving the relevance of responses to caller inputs generated by the IVR system.

Methods may include assigning a tracer daemon to a test input. A daemon may refer to a computer program that runs as a background process, rather than being under the direct control of a user. The tracer daemon may track propagation of the test input as it is processed by one or more machine learning models of the IVR system. The tracing daemon may track interim inputs and interim outputs that are generated by individual machine learning models in response to the test input. In some embodiments, discrete tracing daemons may be assigned to tracking each interim input and/or interim output.

Methods may include detecting when the test input generates an actual output that deviates from an expected output by more than a threshold value. Methods may include identifying at least one target model that is determined to be a source for the detected deviation.

In response to detecting the deviation, methods may include extracting the at least one target model from the IVR system. Methods may include applying a set of test inputs to the extracted model to confirm that the target model is misinterpreting inputs. The set of test inputs may include a set of human-machine interactions that correspond to a conversation.

Methods may include confirming that a deviation of the actual model output from the expected model output is duplicated for the set of test inputs processed by the extracted model. Methods may include confirming that the target model is causing a threshold deviation of an actual final output generated by the IVR system from an expected final output associated with the test input. The AI engine may confirm deviation of a model output based on accuracy, precision and recall scores of the actual output relative to an expected output.

In response to the confirming deviation of the actual final output, methods may include exchanging the extracted model with a replacement model. Exchanging the extracted model may include repositioning the extracted model within a plurality of models that comprise the IVR system. For example, the AI engine may determine that if input was provided to the extracted model after a voice utterance is initially processed by one or more other models, the extracted model may generate more relevant output.

The AI engine may identify a replacement model that is more likely to generate more relevant output. The AI engine may identify the replacement model by submitting a set of test inputs to the replacement model and determining whether the set of test inputs are misinterpreted by the replacement model.

Methods may include determining whether the extracted model will generate a distorted output by simulating an impact of propagating the actual output generated by a target model to other models included in the IVR system.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

Figure 1A:
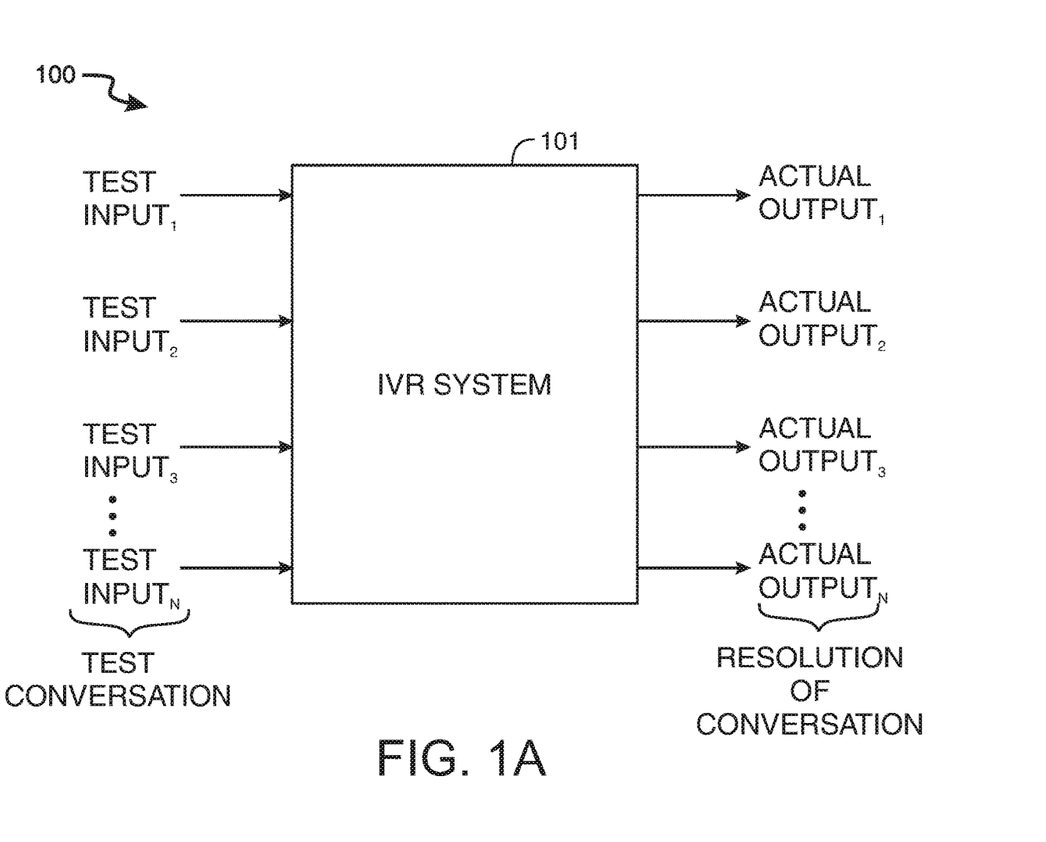
FIG. 1A shows an illustrative system in accordance with principles of the disclosure.

FIG. 1A shows illustrative IVR system 100. IVR system 100 may include hardware components. IVR system may include one or more computer servers. The computer servers may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the computer server may be embodied in hardware or firmware components of the computer servers.

The computer servers may include cloud computing and virtualization implementations of software. Such implementations may be designed to run on a physical server supplied externally by a hosting provider, a client, or other virtualized platform.

Software application programs, which may be used by the computer servers, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs or any other suitable tasks.

Computer servers may include a communication circuit. The communication circuit may include a network interface card or adapter. When used in a WAN networking environment, computer servers may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

Computer servers may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

Computer servers may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

Computer servers may utilize computer-executable instructions, such as program modules, executed by a processor. Generally, program modules include routines, programs, objects, components, data structures, etc. that perform particular tasks or implement abstract data types. Computer servers may be operational with distributed computing environments where tasks are performed by remote processing devices that are linked through a communications network. In a distributed computing environment, program modules may be located in both local and remote computer storage media including memory storage devices. Computer servers may rely on a network of remote servers hosted on the Internet to store, manage, and process data (e.g., "cloud computing" and/or "fog computing").

Computer servers disclosed herein may be produced by different manufacturers. For example, the caller may connect to the IVR system via a first server, and an AI engine included in the IVR system may be run on a second server. Computer servers may capture data in different formats. Computer servers may use different data structures to store captured data. Computer servers may utilize different communication protocols to transmit captured data or communicate with other systems. Despite such operational differences, computer servers may be configured to operate substantially seamlessly to interact with a human caller, execute machine learning models and run an AI engine across different systems operating systems, hardware or networks.

The IVR system may include a telephony server. The telephony server, in operation, may receive inputs submitted by a caller using a communication network. The inputs submitted by the caller may include voice inputs. The inputs submitted by the caller may include text or touch inputs. The telephony server may provide an interface for the caller to interact with an AI engine over the communication network. The telephony server may transmit to the caller, over the communication network, machine generated responses to the inputs. The responses may be generated by one or more machine learning models.

FIG. 1 shows that test inputs may be submitted to IVR system 101. The test inputs may include exemplary voice, text or touch inputs that may be submitted to IVR system 101 by a human caller. FIG. 1 also shows that the plurality of test inputs may form a test conversation. The test conversation may include an initial service request received from a caller and responses of the caller to actual machine generated outputs generated by IVR system 101. The actual machine generated outputs may, collectively, form a machine generated resolution to the test conversation.

Figure 1B:
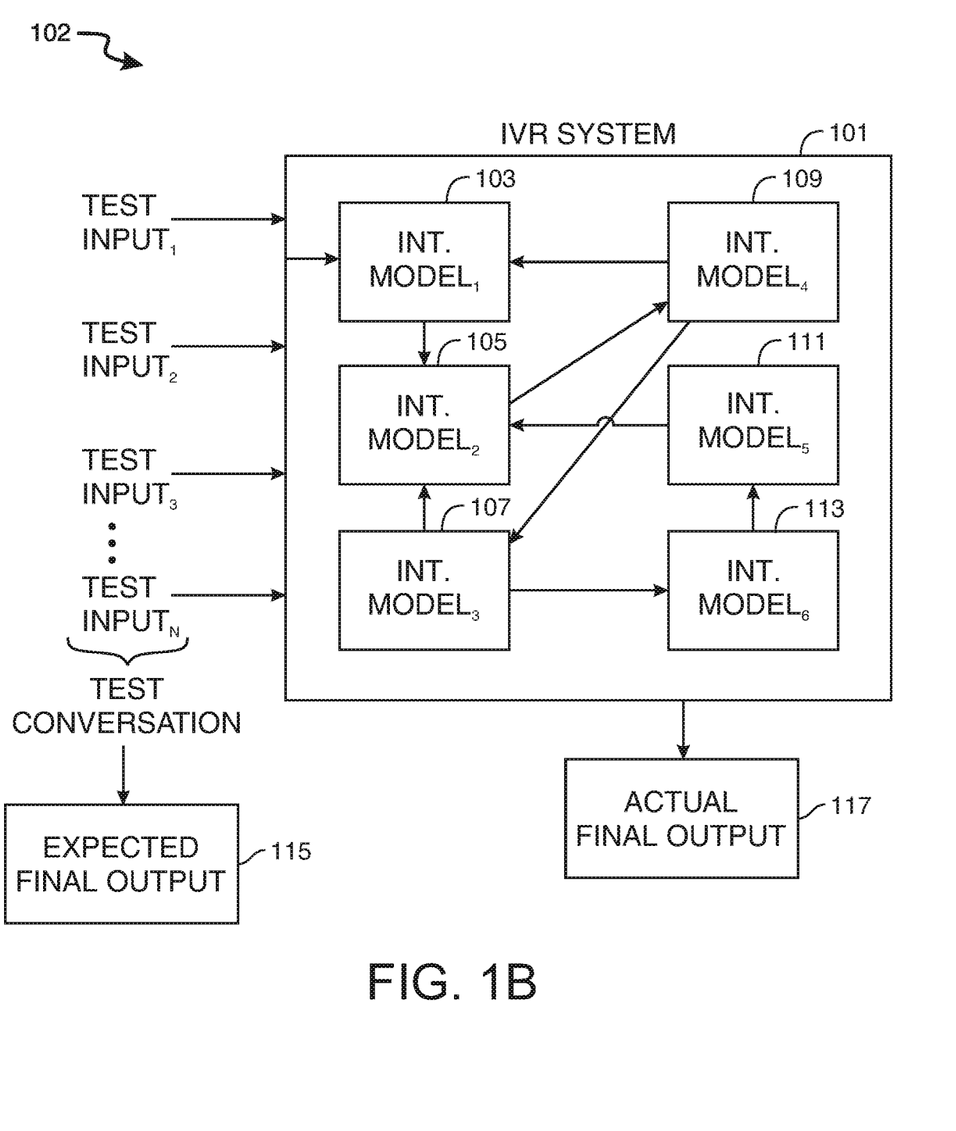
FIG. 1B shows an illustrative system in accordance with principles of the disclosure.

FIG. 1B shows illustrative components 102 of IVR system 101. Components 102 include machine learning models 103, 105, 107, 109, 111 and 113. FIG. 1B shows the machine learning models arranged in a complex, interconnected relationship for processing inputs within IVR system 101. Each of the machine learning models may generate interim outputs. The interim outputs may be provided as interim inputs to another machine learning model.

For example, interim model 103 receives test inputs. Interim model 103 generates an interim output that is provided to interim model 105. Interim model 105 may process the interim output received from model 103 based on an interim output received from model 111. The relationship, arrangement or sequential order of machine learning models in an IVR system may be determined by an AI engine.

FIG. 1B also shows that a test conversation, formed of test inputs$_{1-N}$ is associated with expected final output 115. Expected final output 115 may be an exemplary output known to be relevant and responsive to test inputs$_{1-N}$. Expected final output 115 may include a set of outputs known to be relevant and responsive to test inputs$_{1-N}$.

The machine learning models included in IVR system 101 may collectively generate actual final output 117. Apparatus and methods disclosed herein may determine whether actual final output 117 is a relevant, responsive output to test inputs$_{1-N}$. When actual final output 117 demonstrated that IVR system 101 has misinterpreted test inputs$_{1-N}$, apparatus and methods disclosed herein may identify one or more of the machine learning models that are misinterpreting one or more test inputs$_{1-N}$ or interim inputs. Apparatus and methods disclosed herein may apply artificial intelligence to identify an output that misinterprets an input or an otherwise malfunctioning machine learning model.

Apparatus and methods disclosed herein may apply artificial intelligence to reduce deviation of actual final output 117 from expected final output 115. For example, an AI engine may replace one or more of the interim machine learning models with a replacement model. The AI engine may change the order or relationships between one or more of the interim machine learning models.

Figure 1C:
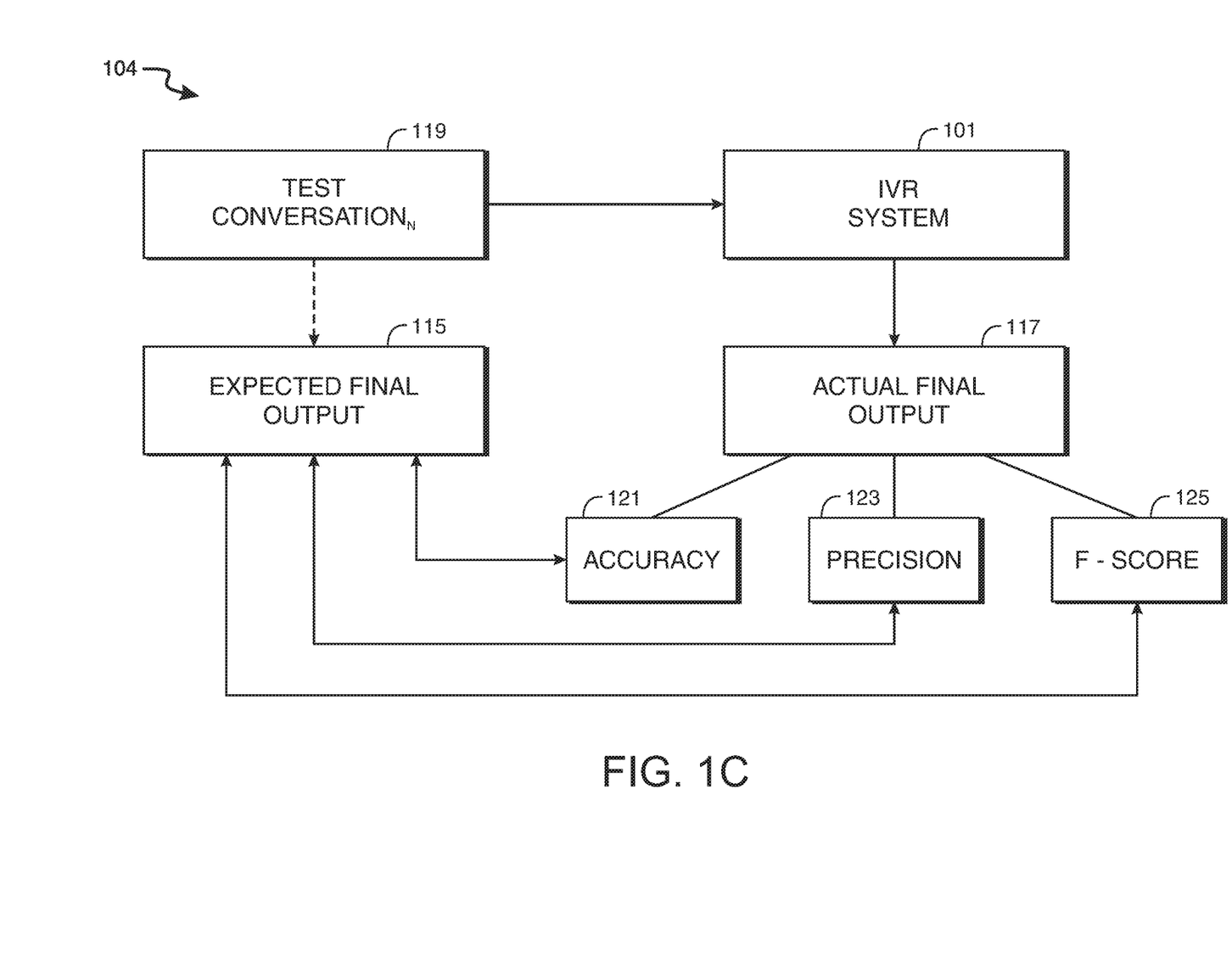
FIG. 1C shows an illustrative process in accordance with principles of the disclosure.

FIG. 1C shows illustrative process flow 104. Process flow 104 shows that IVR system 101 receives test conversation 119. Test inputs 119 are associated with expected final output 115. Expected final output 115 may be an exemplary known resolution of concerns or questions raised by a caller in test conversation 119.

Process flow 104 shows that IVR system 101 generates actual final output 117. Actual final output 117 represents how one or more of the machine learning models within IVR system 101 have interpreted and resolved one or more concerns or questions raised in test conversation 119. Process flow 104 shows that performance metrics including accuracy 121, precision 123 and F-score 125 are calculated for actual final output 117. Accuracy 121, precision 123 and F-score 125 may determine a deviation of actual final output 117 from expected final output 117.

Figure 2:
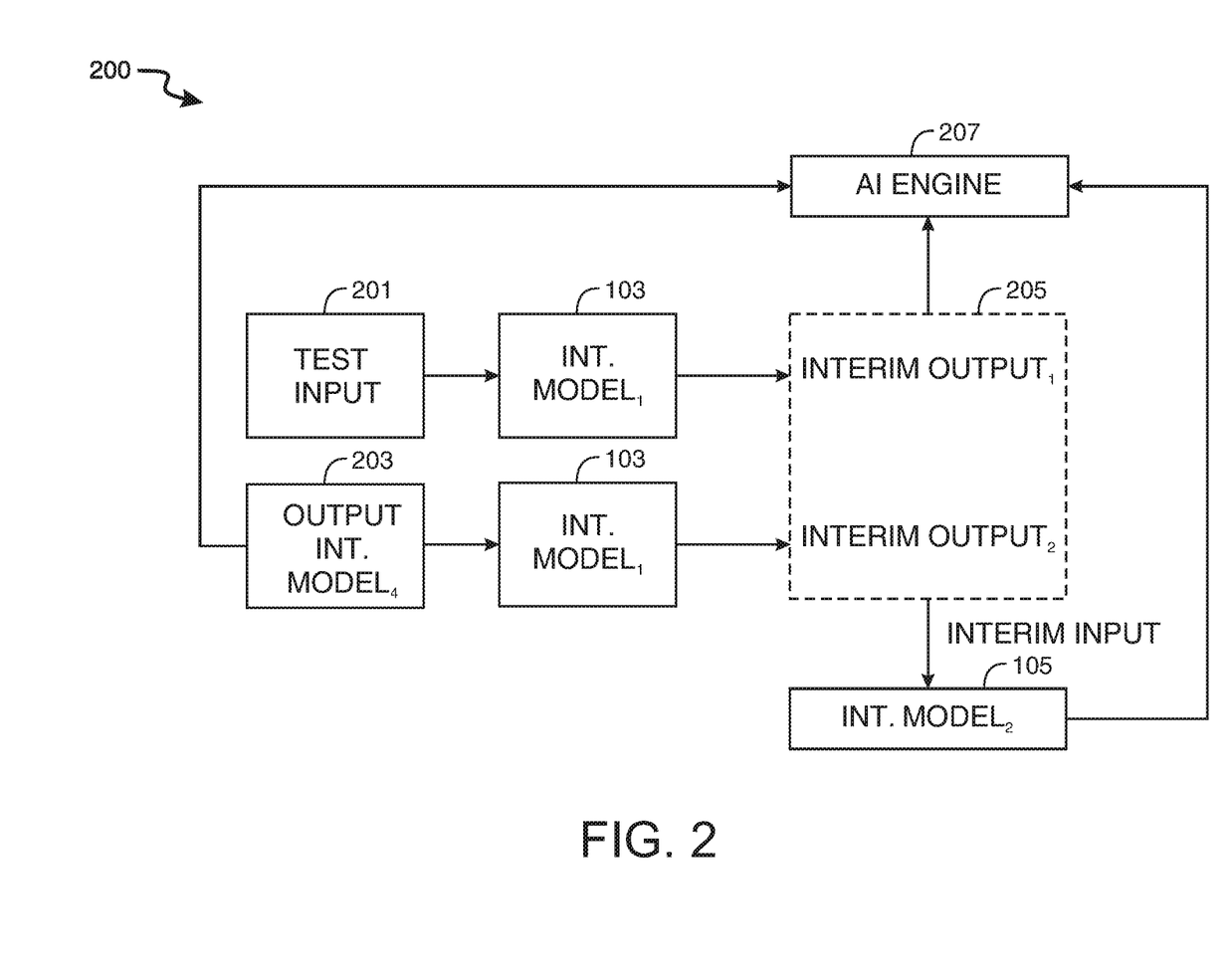
FIG. 2 shows an illustrative system and scenario in accordance with principles of the disclosure.

FIG. 2 shows illustrative process 200 of tracing the processing of interim model inputs and outputs by machine learning models of IVR system 101. Process 200 may be performed and/or controlled by an AI engine. Process 200 shows that test input 201 is provided to interim machine learning model 103 (shown in FIG. 1B). Interim model 103 generates interim output$_1$ in response to test input 201.

Process 200 shows that interim model 103 also receives, as an interim input, interim output 203 generated by interim machine learning model 109 (shown in FIG. 1B). Interim model 103 generates interim output$_2$ in response to interim input 203. Interim outputs$_{1-2}$ may be collectively referred to as interim outputs 205. Process 200 shows that interim outputs 205 are provided as interim inputs to interim machine learning model 105 (shown in FIG. 1B).

Process 200 shows that AI engine 207 determines whether interim inputs 201 and 203 have been misinterpreted by machine learning model 103. AI engine 207 may evaluate output 203 generated by interim model 109. For example, AI engine 207 may determine whether output 203 deviates from an expected output associated with model 109. AI engine 207 may determine whether interim outputs 205 include a misinterpretation of inputs 201 and/or 203. AI engine 207 may evaluate an output generated by interim model 105 in response to interim outputs 205.

AI engine 207 may determine an impact of interim outputs generated by models 109, 103 and 105 on actual a final output (e.g., final output 117 shown in FIG. 1B). For example, AI engine 207 may determine an impact on actual final output 117 if interim inputs 201 and 203 are misinterpreted by model 103. AI engine 207 may determine an impact on actual final output 117 if interim inputs 205 are misinterpreted by interim model 105.

Figure 3:
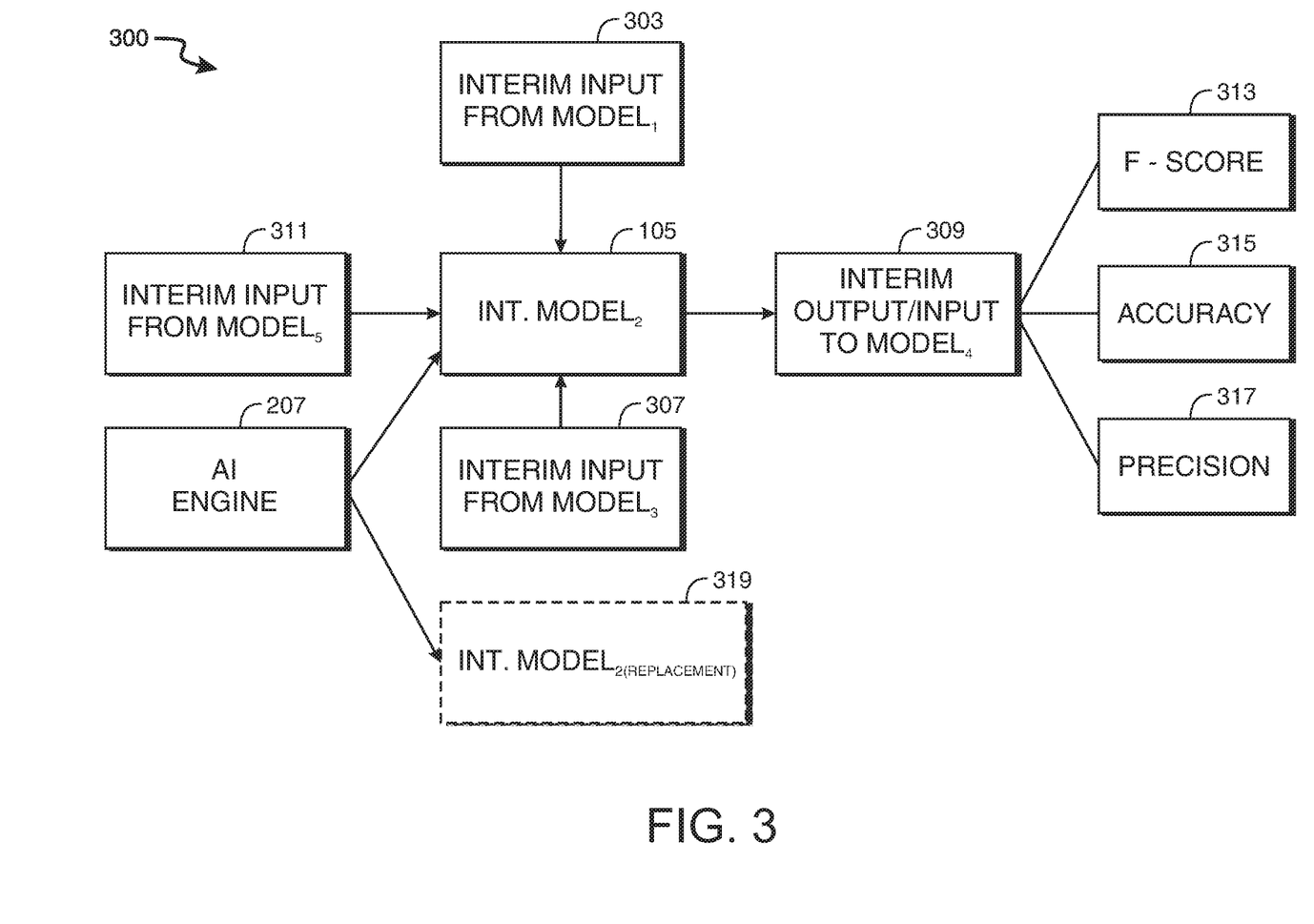
FIG. 3 shows an illustrative system and scenario in accordance with principles of the disclosure.

FIG. 3 shows illustrative scenario 300. Scenario 300 shows illustrative remedial action that may be taken by AI engine 207 in response to detecting a distorted output or misinterpreted inputs.

Scenario 300 shows that AI engine 207 monitors interim inputs 303, 307 and 311 received by model 105 (shown in FIG. 1B). Model 105 receives interim input 311 which is generated by interim model 111 (shown in FIG. 1B). Model 105 receives interim input 303 which is generated by model 103 (shown in FIG. 1B). Model 105 receives interim input 307 generated by interim model 107 (shown in FIG. 1B).

AI engine 207 determines whether interim output 309 includes a misinterpretation of inputs 303, 307 and/or 311 by model 105. If interim output 309 includes a misinterpretation by model 105, the misinterpretation may be exacerbated by model 109 which processes interim output 309. To detect a misinterpretation, AI engine 207 determines F-score 313, accuracy 315 and precision 317 associated with interim output 309. F-score 313, accuracy 315 and precision 317 may be determined relative to an output expected to be generated by model 105.

When AI engine 207 detects that interim output 309 includes a misinterpretation, AI engine 207 may determine to replace model 105. Scenario 300 shows that AI engine 201 has extracted model 319 as a replacement for model 105. AI engine 207 may extract model 319 from a model repository. AI engine 207 may test model 319 using interim inputs 311, 303 and 307 and evaluate whether model 319 generates outputs having improved accuracy 121, precision 123 and F-score 125 associated with output generated by model 105.

Figure 4:
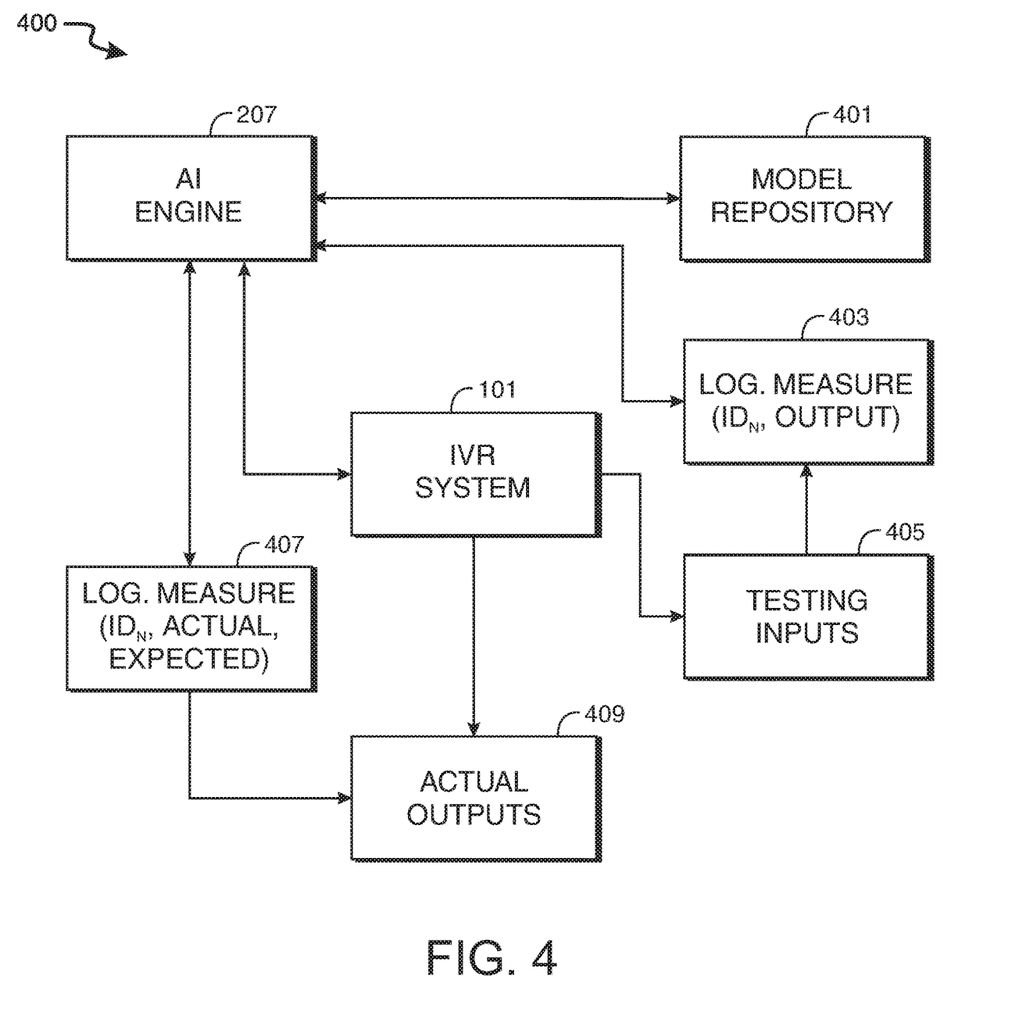
FIG. 4 shows an illustrative system in accordance with principles of the disclosure.

FIG. 4 shows illustrative testing scenario 400. Scenario 400 shows that AI engine 207 may applies function 403 to test inputs 405. Test inputs 405 will be used to test a final output generated by IVR system 101. Test inputs 405 may include a set of utterances that form conversation ID$_N$. Conversation ID$_N$ may identify a set of caller utterances that form the conversation. Function 403 may determine an expected output that is responsive and relevant to testing inputs 405.

In some embodiments, an expected output associated with a conversation may be defined by a creator of a model or test inputs. In some embodiments, AI engine 207 may determine an exemplary expected output by iteratively submitting testing inputs 405 to models stored in model repository 401. AI engine 207 may utilize machine learning techniques to extrapolate an exemplary expected output based on responses to testing inputs 405 generated by models stored in repository 401. Illustrative machine learning testing techniques may include one or of: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. Other suitable machine learning techniques may be utilized.

Scenario 400 shows that AI engine 207 may apply function 407 to actual outputs 409 generated by the machine models of IVR system 101 in response to testing inputs 403. Parameters passed by AI engine 207 to function 407 may include conversation ID$_N$. Parameters passed by AI engine 207 to function 407 may include actual outputs generated by IVR system 101 in response to conversation ID$_N$. AI engine 207 may obtain one or more actual outputs from one or more machine learning models utilized by IVR system 101 (e.g., shown in FIG. 1A). Parameters passed by AI engine 207 to function 407 may include expected outputs responsive to conversation ID$_N$. The expected outputs may be generated by function 403. Function 407 may generate performance metrics for the actual outputs generated by IVR system 101 in response to testing inputs 405 that include conversation ID$_N$.

For example, AI engine 207 may determine whether outputs generated by machine learning models of IVR system 101 misinterpret one or more utterances included in conversation ID$_N$. In some embodiments, AI engine 207 may determine whether actual outputs generated by individual machine learning models of IVR system 101 misinterpret one or more utterances included in conversation ID$_N$.

When AI engine 207 detects a misinterpretation, AI engine 207 may replace one or more of interim models included in IVR system 101 with a model extracted from repository 401. Function 403 may be utilized to locate a model within repository 401 that does not misinterpret one or more of testing inputs 405. Function 403 may be utilized to locate a model within repository 401 that is less likely to misinterpret one or more of testing inputs 405.

Figure 5:
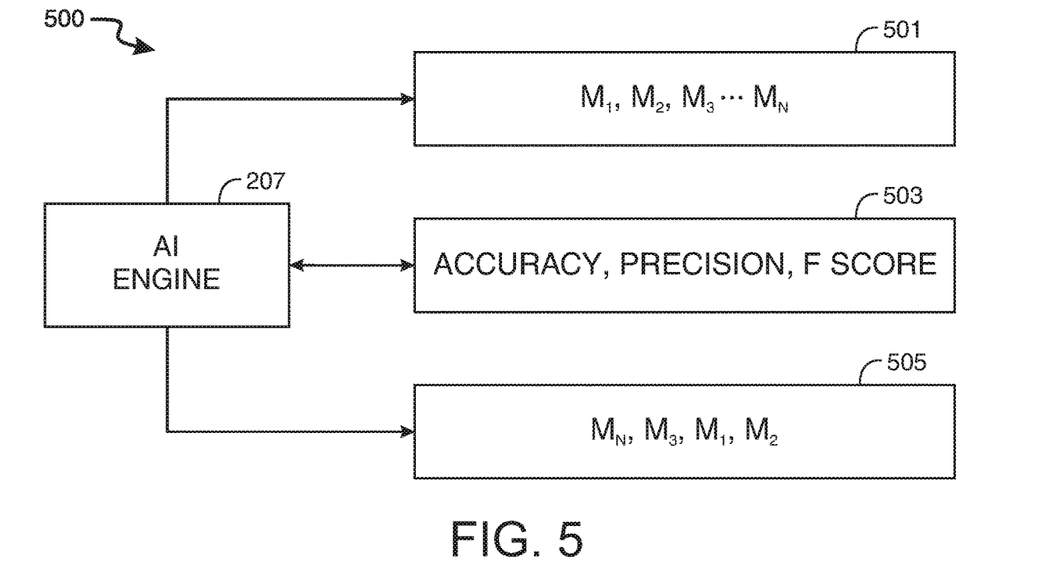
FIG. 5 shows an illustrative process in accordance with principles of the disclosure.

FIG. 5 shows illustrative remedial actions 500 taken by AI engine 207 in response to detecting a misinterpretation of testing inputs 405 by IVR system 101. Remedial actions 500 show that IVR system 101 (shown in FIG. 1A) includes initial arrangement 501 of machine learning models 103-113. During a testing scenario (e.g., shown in FIG. 4), AI engine 207 determines performance metrics 503 associated with outputs of machine learning models 103-113. Performance metrics 503 may indicate that initial sequence 501 is causing IVR system 101 to generate actual final output 117 that deviates from expected final output 115. A threshold deviation may be detected based on calculation of performance metrics 503.

In response to detecting the deviation, AI engine 207 reconfigures the models of IVR system 101. Revised arrangement 505 shows that AI engine 207 has changed positions of machine learning models 103-113 within IVR system 101. For example, revised arrangement 505 shows that an interim output of Model$_3$ (107) is now provided as an interim input to Model$_1$ (103).

The arrangement of models 103-113 in revised arrangement 505 is different form the arrangement shown in FIG. 1B. AI engine 207 may determine that revised arrangement 505 yields outputs having less deviation from expected output 115 associated with testing inputs, such as testing inputs 405 (shown in FIG. 4).

Figure 6:
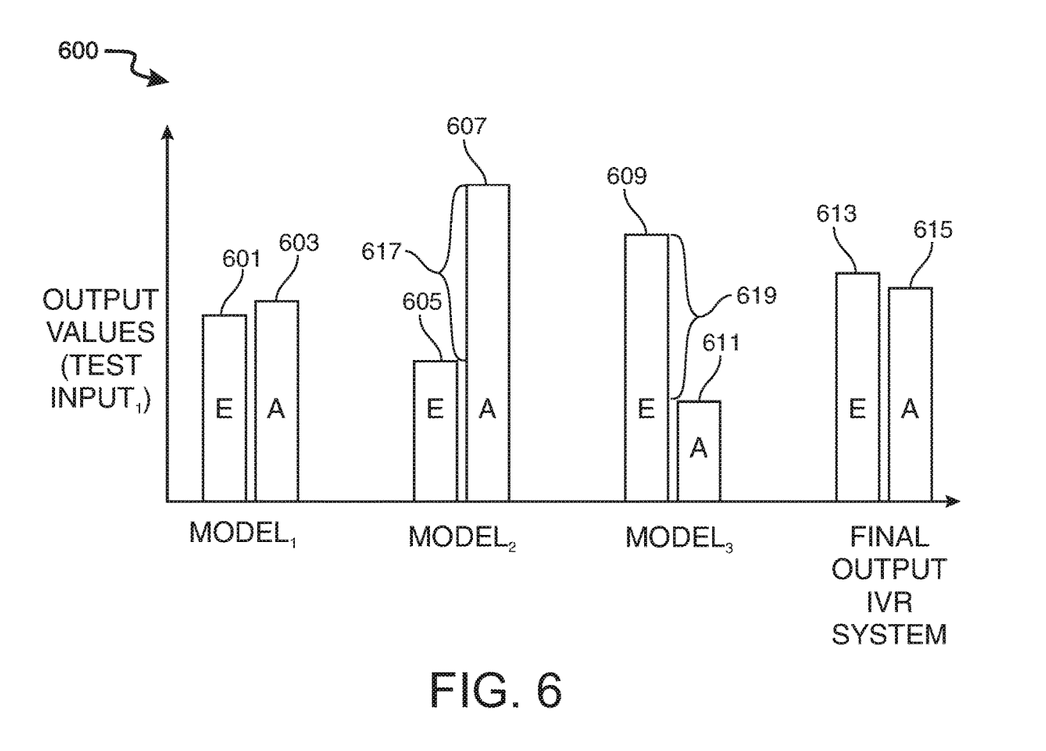
FIG. 6 shows an illustrative process in accordance with principles of the disclosure.

FIG. 6 shows illustrative testing results 600 generated by AI engine 207. Results 600 illustrate the complexity of testing a machine learning system, such as IVR system 101.

Results 600 show that in response to illustrative testing input$_1$. Test input$_1$ may be conversation ID$_N$ discussed in FIG. 4. Results 600 shows that model$_1$ (103) generated actual output 603. Results 600 show actual output 603 is relatively close in value to expected output 601. Value of an output may be defined based on precision, accuracy, F-score or other performance metrics associate with the output. AI engine 207 may therefore conclude that model$_1$ has not misinterpreted testing input$_1$.

Results 600 show that when testing input$_1$ is submitted to IVR system 101, model$_2$ generates actual output 607. Results 600 show actual output 607 deviates by threshold deviation 617 from expected output 605. AI engine 207 may therefore conclude that model$_2$ has misinterpreted testing input$_1$.

Results 600 show that in response to testing input$_1$, model$_3$ (107) generates actual output 611. Results 600 show that actual output 611 deviates by threshold deviation 619 from expected output 609. AI engine 207 may therefore conclude that model$_2$ has misinterpreted testing input$_1$.

Results 600 also show that despite threshold misinterpretations of testing input$_1$ by model$_2$ and model$_3$, IVR engine 101 has generated actual final output 615. Actual final output 615 is relatively close to expected final output 613. AI engine 207 may therefore conclude that IVR system 101 has not misinterpreted testing input$_1$. However, AI engine 207 may also determine that model$_2$ and model$_3$ need to be replaced. Misinterpretations by model$_2$ and model$_3$ may increase a likelihood that actual inputs will be misinterpreted by IVR system 101.

Thus, methods and apparatus for MACHINE LEARNING FRAMEWORK FOR TUNING INTERACTIVE VOICE RESPONSE SYSTEMS are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") system for tuning operation of an interactive voice response ("IVR") system, the AI system comprising:
    a plurality of machine learning models configured to interpret a set of voice utterances that comprise a conversation;
    a tuning module configured to test each member of the set of voice utterances by tracing:
        an interim input received by a target model included in the plurality of machine learning models;
        an interim actual output generated by the target model in response to the interim input; and
        deviation of the interim actual output from an interim expected output associated with the target model; and
    an AI engine that:
        determines when the interim actual output deviates from interim expected output such that a final actual output generated by the IVR system in response to the set of voice utterances does not correspond to an expected final output associated with the set of voice utterances;
        identifies a replacement model that decreases the deviation between the interim actual output and the interim expected output; and
        exchanges the target model with the replacement model within the IVR system, thereby bringing the actual final output within a threshold range of the expected final output.

2. The AI system of claim 1, wherein when the actual final output deviates from the expected final output by a threshold F-score value, the AI engine exchanges each of the plurality of machine learning models with a replacement machine learning model.

3. The AI system of claim 1, wherein the set of voice utterances comprises sequentially issued voice commands and the tuning module is configured to test each of the set of voice utterances in parallel.

4. The AI system of claim 1, wherein the set of voice utterances comprise sequentially issued voice commands, and the tuning module is configured to test:
    a first subset of the set of voice utterances in parallel; and
    a second subset of the set of voice utterances sequentially.

5. The AI system of claim 1 wherein a deviation of the actual final output from the expected final output is defined by:
    accuracy of the actual interim output relative to the expected interim output;
    precision of the actual interim output relative to the expected interim output; and
    F-score of the actual interim output relative to the expected interim output.

6. The AI system of claim 1 wherein the AI engine is configured to iteratively exchange one or more of the plurality of machine learning models until the actual final output does not deviate from the expected final output by a threshold F-score value.

7. The AI system of claim 1 wherein the plurality of models comprises of a subset of machine learning models that process the set of voice utterances and generates the actual final output of the IVR system.

8. An artificial intelligence ("AI") method for tuning operation of an interactive voice response ("IVR") system, the AI method comprising:
    assigning a tracer daemon to a test input, the tracer daemon configured to track propagation of the test input as it is processed by one or more machine learning models included in the IVR system;
    when the test input triggers generation of an actual model output that deviates from an expected model output by more than a threshold value, extracting at least one target model from the IVR system that is determined to be a source for the detected deviation;
    applying a set of test inputs to the at least one target model and determining that the detected deviation of the actual model output from the expected model output:
        (a) is duplicated for the set of test inputs by the at least one target model; and
        (b) causes a threshold deviation of an actual final output generated by the IVR system in response to at least one of the set of test inputs from an expected final output associated with the at least one of the set of test inputs; and
    exchanging the at least one target model with a replacement model.

9. The AI method of claim 8, further comprising detecting the source of the detected deviation based on differences in accuracy, precision and recall scores of the actual model output relative to scores associated with the expected model output.

10. The AI method of claim 8 further comprising determining whether the at least one target model will cause the threshold deviation of the actual final output from the expected final output by simulating an impact of propagating the actual model output to at least one other machine learning model included in the IVR system.

11. The AI method of claim 8 wherein the exchanging of the at least one target model comprises repositioning the at least one target model within models that comprise the IVR system and process the test input.

12. The AI method of claim 8 wherein the set of test inputs comprises human-machine interactions that correspond to a conversation.

13. A machine learning method for improving operation of machine learning models that control an interactive voice response ("IVR") system, the method comprising:
submitting a test input to the IVR system;
for each of a plurality of interim models included in the IVR system:
tracking an interim input submitted to each interim model of the plurality of interim models; and
tracking a set of interim outputs generated in response to the interim input;
applying a first machine learning testing technique to stitch together each of the set of interim outputs and generate a final actual output; and
applying a second machine learning testing technique that:
detects one or more of the plurality of interim models that generates an interim output that is misinterpreted by a subsequent interim model; and
exchanges the interim model that generated the interim output that is misinterpreted with a replacement interim model;
wherein, each time the second machine learning testing technique is applied, the second machine learning testing technique reduces a deviation between an expected final output of the IVR system in response to the test input and the actual final output generated by the IVR system in response to the test input.

14. The machine learning method of claim 13 wherein the second machine learning testing technique, in response to detecting the interim output that is misinterpreted, generates a new arrangement of the plurality of interim models within the IVR system.

15. The machine learning method of claim 13 further comprising detecting the interim output that is misinterpreted by:
submitting the interim input to a first subset of the plurality of interim models in parallel with submitting the interim input to a second subset of the plurality of interim models; and
for the first subset of the plurality of interim models, applying the first machine learning testing technique to stitch together each of the set of interim outputs generated by the first subset and generate a first actual final output;
for the second subset of the plurality of interim models, applying the first machine learning testing technique to stitch together each of the set of interim outputs generated by the second subset and generate a second actual final output;
applying the second machine learning testing technique that detects whether the first or the second actual final output includes a threshold deviation from the expected final output; and
removing, from the IVR system, the subset of interim models that generate outputs associated with the threshold deviation.

16. The machine learning method of claim 13, wherein the plurality of interim models comprises:
a first model for converting a voice input to digital text;
a second model for determining one or more prosody attributes of the voice input;
a third model for determining a sentiment associated with the voice input; and
a fourth model for assigning a label to the interim input based on the interim outputs of the first, second and third models.

17. The machine learning method of claim 13 further comprising, for the interim output generated by each of the plurality of interim models in response to the interim input, determining:
accuracy of the interim output relative to an expected interim output;
precision of the interim output relative to the expected interim output; and
F-score of the interim output relative to the expected interim output; and
whether each interim output includes a misinterpretation based on the accuracy, precision and F-score.

18. The machine learning method of claim 17, further comprising detecting whether the actual final output generated by the plurality of interim models collectively includes a collective misinterpretation of the test input based on the accuracy, precision and F-score of the interim outputs.

19. The machine learning method of claim 13 further comprising, determining:
accuracy of the actual final output relative to an expected final output associated with the test input;
precision of the actual final output relative to the expected final output associated with the test input;
F-score of the actual final output relative to the expected final output associated with the test input; and
suspending an operation of the plurality of interim models within the IVR system based on the accuracy, precision and F-score of the actual final output.

20. The machine learning method of claim 13, wherein, the test input comprises a plurality of utterances that comprise a test conversation.

* * * * *